United States Patent [19]

Fitzpatrick et al.

[11] 4,279,294
[45] Jul. 21, 1981

[54] HEAT PIPE BAG SYSTEM

[75] Inventors: Peter R. Fitzpatrick; Russell G. Meyerand, Jr., both of Glastonbury; Kenneth E. Shotwell, Stafford Springs, all of Conn.

[73] Assignee: United Technologies Corporation, Hartford, Conn.

[21] Appl. No.: 972,599

[22] Filed: Dec. 22, 1978

[51] Int. Cl.³ .......................................... F28D 15/00
[52] U.S. Cl. ...................................... 165/45; 165/46; 165/104.26; 62/238.1
[58] Field of Search ............................ 165/45, 105, 46

[56] References Cited

U.S. PATENT DOCUMENTS

| | | |
|---|---|---|
| 2,749,724 | 6/1956 | Borgerd et al. |
| 3,402,761 | 9/1968 | Swet |
| 3,450,195 | 6/1969 | Schnacbe ........................ 165/105 X |
| 3,563,304 | 2/1971 | McGrath |
| 3,581,513 | 6/1971 | Cranmer et al. |
| 3,604,503 | 9/1971 | Feldman, Jr. et al. |
| 3,604,504 | 9/1971 | Kessler, Jr. et al. |
| 3,931,532 | 1/1976 | Byrd ................................ 165/105 X |
| 3,948,313 | 4/1976 | Best |
| 3,955,042 | 5/1976 | Kellow et al. |
| 3,990,502 | 11/1976 | Best |
| 4,007,781 | 2/1977 | Masters ............................ 165/105 X |
| 4,040,478 | 8/1977 | Pogson et al. |
| 4,042,012 | 8/1977 | Perry et al. |

OTHER PUBLICATIONS

Dunn et al., P., *Heat Pipes*, pp. 280-282, Pergamon Press, N.Y.
Vestal et al., D. M., Jr., *Design of a Heat Pump Buried Coil*, Texas A & M College, pp. 1-33.
Chi, S. W., *Heat Pipe Theory and Practice*, McGraw-Hill Co., N.Y., pp. 219-221.

*Primary Examiner*—Albert W. Davis
*Attorney, Agent, or Firm*—Harry J. Gwinnell

[57] ABSTRACT

Method and apparatus for utilizing the earth as a heat source and heat sink for heating and cooling buildings are disclosed. Flexible material such as hollow plastic or metal foil bags which can be buried in deep, narrow trenches are draped over and clamped to heat transfer fluid conduits or conventional heat pipes vastly increasing the heat transfer surface area serving the conduits or heat pipes. The heat pipe bags contain a heat transfer fluid and can contain wicks which are in heat transfer communication with the heat transfer fluid conduits or other heat pipes. The plastic or metal of the heat pipe bag similarly encloses the wick forming a closed, sealed system which can also include the conduit or heat pipe. Such conduit-heat pipe bag combination can be used in combination with conventional heat pumps to both heat and cool buildings.

27 Claims, 9 Drawing Figures

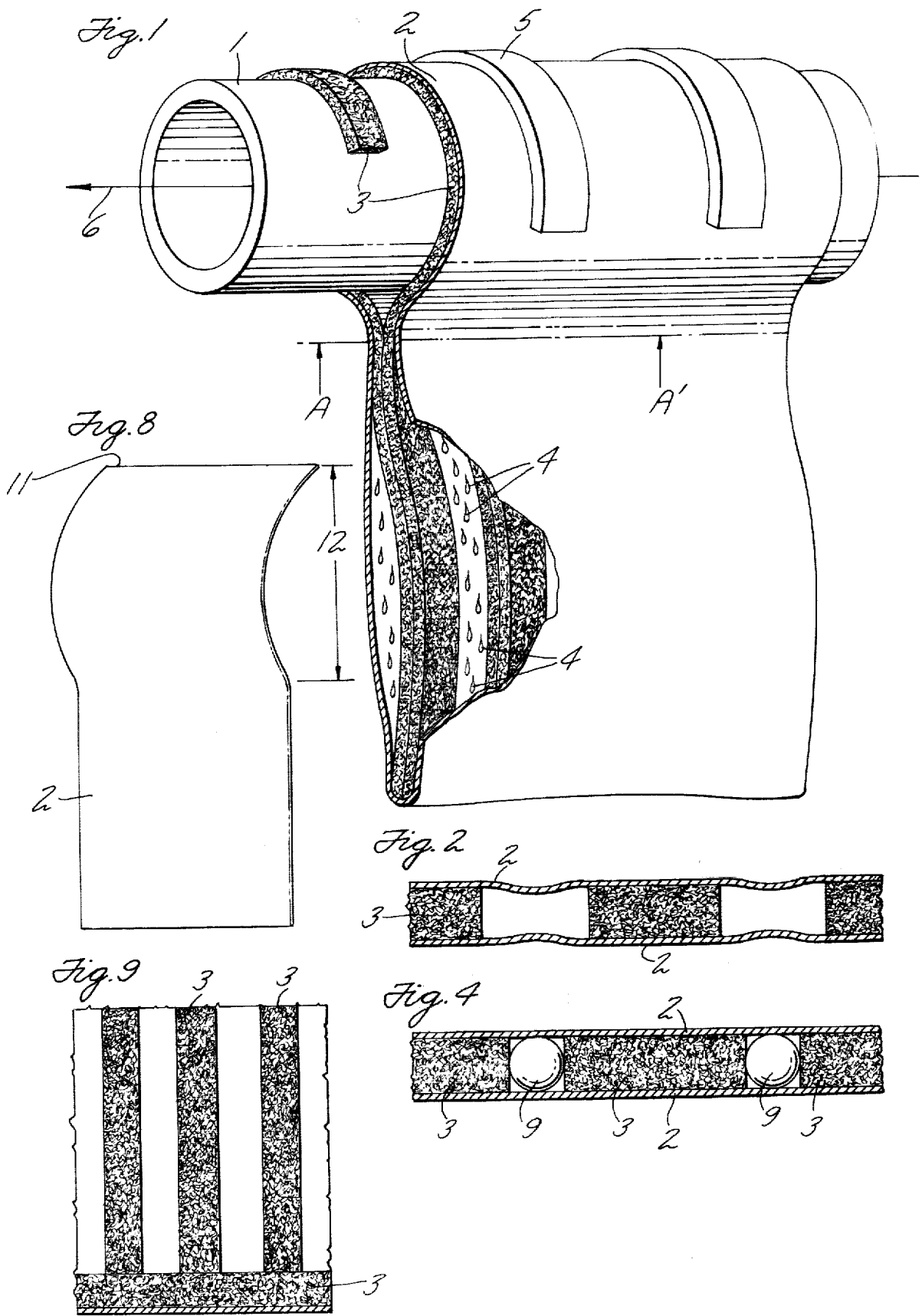

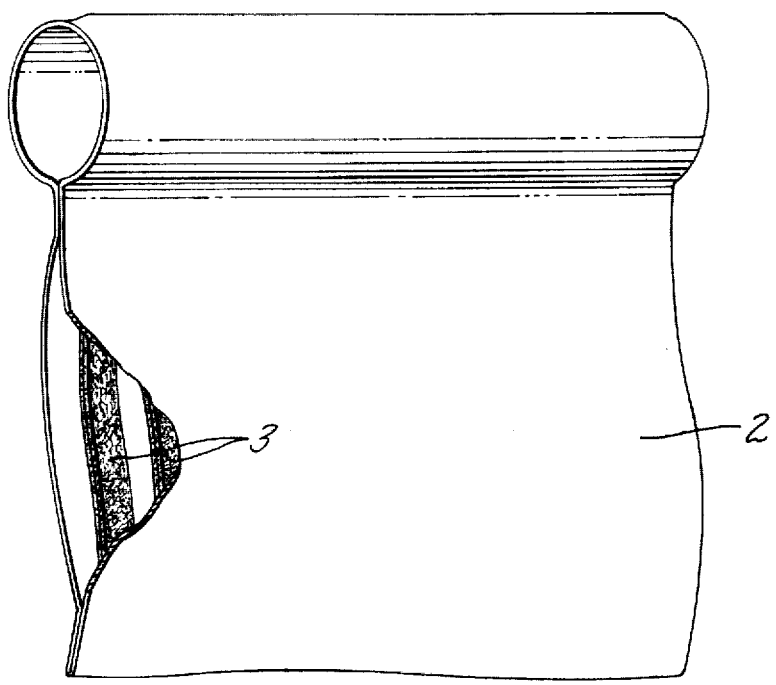
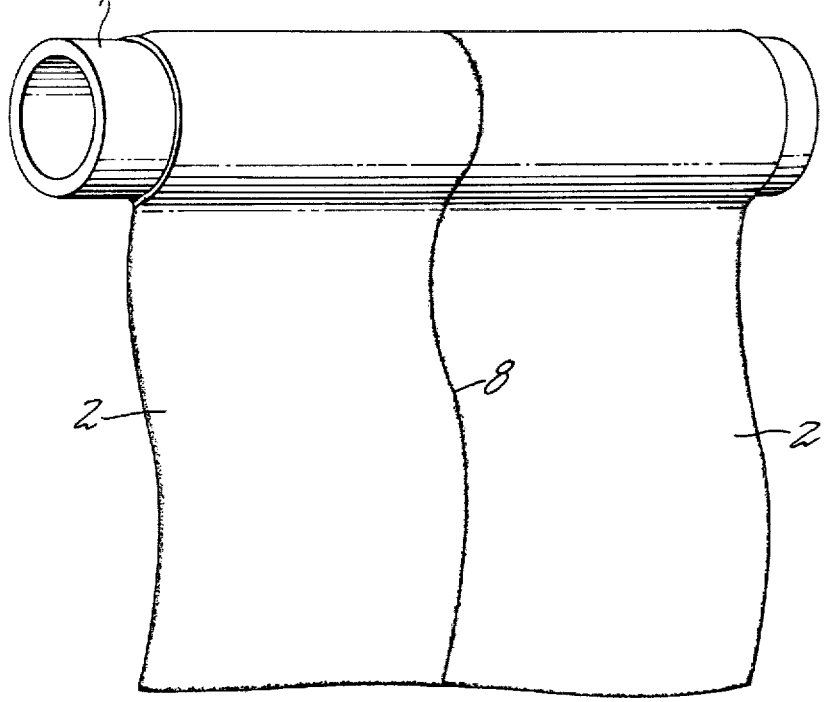

4,279,294

HEAT PIPE BAG SYSTEM

CROSS REFERENCE TO RELATED APPLICATIONS

Attention is directed to Ser. No. 972,598, of common assignee, filed of even date herewith entitled "Dual Cycle Heat Pipe-Method and Apparatus", which teaches a method of heating and cooling buildings through the use of a heat pipe system.

BACKGROUND OF THE INVENTION

1. Field of the Invention

The field of art to which this invention pertains is heat exchange utilizing an intermediate fluent material for receiving and discharging heat based on a condensing and evaporating system.

2. Description of the Prior Art

It is well known in this art to bury such things as copper tubing in an attempt to utilize the constant temperature of the earth as a source of heat to reduce heating costs for heating building structures. This same system has also been used to provide a heat sink for aiding in the airconditioning or cooling of building structures. In such systems, a first heat transfer fluid is pumped through the copper coils beneath the surface of the earth to absorb or transmit heat to or from the earth. The problems with such systems entail using large amounts of piping to provide sufficient surface area to make such system even approach practicability. Furthermore, extensive installation procedures are required where massive amounts of ground must be broken in order to install amounts of piping which would make such systems practical.

Similarly, while it has been proposed to utilize a heat pipe system to provide heating and cooling to residential buildings and other similar structures, little actual installation of these systems has been evidenced. For example, the use of heat pipes in conjunction with furnace, hot water and fireplace systems has been suggested (Heat Pipe Theory and Practice, by S. W. Chi, page 219); U.S. Pat. No. 4,042,012 discloses a heat pump-heat pipe system utilizing the earth as the heat source and heat sink with heat pipes buried in a hole and surrounded by water-soaked absorbant polymer particles; U.S. Pat. No. 2,749,724 utilizes a heat pump and coil arrangement to take advantage of the earth's temperature constant to heat a residential dwelling; and U.S. Pat. No. 3,563,304 discloses a heat exchange system for providing refrigeration to a building structure where part of the heat exchange system may be buried in the ground.

Accordingly, while many systems have been proposed, few systems have been actually installed because of the intricacies of the systems, their large size, and the intricate installation procedures required which include digging up and moving large amounts of soil. Because of such problems, the expense involved in installing such systems is excessive. The present invention solves these problems by providing a relatively simple, inexpensive heat pipe bag system providing an efficient method of utilizing the relatively constant temperature of the earth in a heat exchange system which is efficient, relatively simple in structure, and relatively easy to install thereby making widespread use of the system economically feasible.

BRIEF SUMMARY OF THE INVENTION

The present invention overcomes the difficulties in utilizing the constant temperature of the earth as a heat source and heat sink for heating and cooling buildings and further overcomes the problem of the generally low thermal conductivity of the earth which conventionally requires relatively extensive heat pipe installations, and extensive distribution and collection systems in the prior art.

According to the present invention flexible structures such as plastic or metal foil heat pipe bags containing a heat transfer fluid are used in heat transfer communication with heat transfer fluid conduits or conventional heat pipes to increase the efficiency of the heat pipe system in relatively simple, inexpensive fashion. The size and shape of the bags are such that they require relatively simple procedures to install with reduced earth movement, for example, the digging of a simple trench. Such systems can be used in conjunction with conventional heat pump systems to heat or cool buildings. Also, for reduction of dependence on gravity to move the heat transfer fluids about in the heat pipe bags and to aid in keeping the sides of the bags sufficiently separated to allow for fluid flow wick material is present in the bags.

The foregoing and other objects, features and advantages of the present invention will become more apparent in light of the following detailed description of preferred embodiments thereof and as discussed and illustrated in the accompanying drawings.

BRIEF DESCRIPTION OF THE DRAWINGS

FIG. 1 demonstrates the basic structure of the heat pipe bag in conjunction with a circulation pipe.

FIG. 2 is a vertical cross section of the bag of FIG. 1.

FIG. 3 demonstrates a particular embodiment of the sealed bags.

FIG. 4 demonstrates horizontal placement of spacers in the heat pipe bag system.

FIGS. 7 and 8 demonstrate heat pipe bags adapted to be combined with heat transfer fluid circulation pipes.

FIG. 9 demonstrates a wick system in the heat pipe bag.

DESCRIPTION OF THE PREFERRED EMBODIMENT

Figure 5:
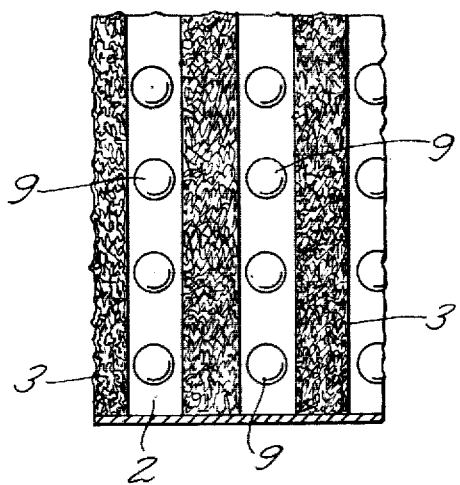
FIG. 5 demonstrates vertical placement of spacers in the heat pipe bags.

With the present invention, the use of heat pipe bags of large surface area significantly reduces the amount of pipe necessary to transfer the same amount of heat as the bags would. Furthermore, with the use of a relatively thin and long design the digging of a simple trench is all that is necessary as far as ground movement or ground breaking is concerned to effect installation.

As mentioned above, the heat pipe bag is a thin walled, flexible material, preferably metal foil, plastic, plastic containing metal particles, or fiberglass reinforced plastic, the key being the ability of the bag material to transfer heat to and from the earth and conform its shape to a variety of ground surfaces. In fact, the bag flexibility provides an additional advantage of improved ground contact further increasing the heat transfer efficiency of the system. In addition to flexibility, the heat pipe bags should be puncture resistant, inert to the heat transfer fluids, especially the second heat transfer fluid, and able to withstand prolonged below-ground exposure. The bags can vary in dimensions depending on installation and thermodynamic design considerations, however, thin rectangular bags are preferred for ease of installation and handling. A preferred design is a high density polyethylene bag with wall thickness of about 0.008 inch thick, four feet wide and eight feet long. The bags should be thick enough to withstand the rigors of installation without puncture while thin enough to maximize heat transfer. Similarly, the bags should be of relatively large surface area to maximize heat transfer per bag but also be of manageable size for transportation and installation.

In the particular embodiment shown in the figures the wick material wraps around the heat transfer conduit and extends radially outward in the bag from the conduit to the bag end. It is of course important for the wick material to span the condensation and vaporization zones in the bag for effective heat transfer in the bag system. Any conventional wick material can be used in the bag provided it has the requisite flexibility to be able to conform to and wrap around the surface of the heat transfer conduits where desirable. It should also preferably extend in the bag along the anticipated path of principal heat transfer. In the system of the figures, fiberglass wicks were employed. As with the other components in this system, the size and shape of the wicks may vary depending on various design and thermodynamic considerations. The wicks of the figures were one inch thick, six inches wide and spaced at six inch intervals. Additional wick material can also be placed along the bottom end of the heat pipe bag contacting the ends of the wick material which extend radially outward from the heat transfer conduit to ensure access by the entire bag of the heat transfer fluid in those instances where an uneven bag causes heat transfer fluid to gravitate to one end of the bag. Note FIG. 9.

The bags, and wicks where desired, are secured to the heat transfer conduits in close contact with such conduits by clamps external to the bag. While the wicks could be held against the heat transfer fluid conduits by clamps inside the bag, it is more efficient and preferred to use an external clamp. The clamps can be any material which will function and withstand below ground exposure. Metal such as aluminum fulfills this requirement, but plastic clamps molded so as to conform closely to the bag and conduit are preferred. Again, high density polyethylene is particularly suitable in this regard. Furthermore, both plastic and metal clamps can be held in place by conventional adhesives or mechanical means. And, of course, the clamps should be positioned on the bags in such a manner so as not be puncture the bags.

The heat transfer fluid conduits can be any material useful for this purpose such as copper or aluminum pipe which can transfer heat to and from the ground. As above, the pipe size can vary based on installation and thermodynamic design considerations. The pipe of the figures has a three inch inside diameter and $\frac{1}{4}$ inch wall thickness.

While the heat transfer fluid in the heat transfer fluid conduit can be the same as that in the heat pipe bag, it is preferred to vary the two. For example, it is preferred to use either water or a 1:1 water:ethylene glycol (by volume) mixture as the first heat transfer fluid in the circulation pipe and Freon ®-11 ($CCl_3F$) (du Pont de Nemours, Inc.) as the second heat transfer fluid in the heat pipe bags. However, other conventional heat transfer media can be used in either or both the conduit or bag such as alcohols, ammonia and other Freons. The heat transfer fluid in the heat pipe bag preferably has a vapor pressure at or near atmospheric (14.7 p.s.i.g.) between about 30°–100° F. and most preferably a boiling point of about 55° F. at one atmosphere of pressure. Such fluids will work effectively at all ground locations in which the heat pipe bag will be used.

As shown in FIG. 1, buried heat transfer fluid circulation pipe 1 is at least partially enclosed by heat pipe bag 2 containing wicks 3 and a second heat transfer fluid 4. Such bags are held in place by clamps 5.

In the heating cycle, the first heat transfer fluid 6 having given off its heat to provide heat for the building structure, passes in its relatively cooled state through heat transfer fluid circulation pipe 1. The second heat transfer fluid in a relatively warmed state evaporates from the surface of the bag 2 and is condensed by the pipe 1 in its relatively cooled state by virtue of the first heat transfer fluid 6 passing therethrough. Heat is transferred from the evaporating second heat transfer fluid to the first heat transfer fluid 6 through pipe 1. First heat transfer fluid 6 continues on in a warmed state to provide heat to the heat pump via a heat exchanger thereby lessening the amount of heat necessary to heat the residential or other building structure; then it continues back through pipe 1 to continue the cycle once again. Meanwhile, the second heat transfer fluid 4 flows to the bottom of the heat pipe bag 2 as a condensed liquid and as it flows down the sides of the bag, heat is transferred to the second heat transfer fluid from the ground surface outside the bag thereby causing the evaporation of the second heat transfer fluid and the condensation of the second heat transfer fluid from the pipe thus continuing the cycle. Additionally, the wick transports the condensed liquid down the bag by capillary action toward the warmer surface of the heat pipe bag causing additional evaporation to begin the cycle again.

FIG. 2 demonstrates a vertical section of the bag of FIG. 1 along lines A—A', demonstrating the close proximity of the wick 3 and the sides of the heat pipe bag 2 for efficient evaporative contact.

FIG. 3 demonstrates another embodiment of the invention wherein a series of bags 2 are clamped to a heat transfer fluid circulation pipe 1 but are sealed by individual seals 8. In the case of plastic containing bags, such seals can be effected by hot pressing, heat sealing or by simply employing chemical adhesives or solvent welding. In the case of metals, such seals can be mechanical seals, adhesive seals or simple crimping. The advantage of such sealing is that, if for example, in installation one bag is punctured it will not affect the next adjacent bag's operation. Similarly, spacers 9 such as foam blocks or hollow balls can be placed intermittently between the walls of the bags 2 and the wicks 3 either horizontally as in FIG. 4 or vertically as in FIG. 5 or both to aid in preventing bag collapse to provide for more efficient circulation of the fluids in the bags.

In the cooling cycle, the bag of FIG. 1 works as follows. First heat transfer fluid 6 flows through pipe 1 transferring heat to the second heat transfer fluid 4, both vaporizing the second heat transfer fluid in the spaces between the wicks and vaporizing the second heat transfer fluid off the wicks in contact with the pipe 1. The vaporized second heat transfer fluid condenses against the heat pipe bags and flows to the bottom of the bag where, by capillary action, it is transported through the wicks back to the pipes to continue the cycle once again. Heat is again transferred from the first heat transfer fluid to the second heat transfer fluid causing it to again evaporate, etc. The cooled first heat transfer fluid 6 continues on to the heat pump to absorb heat from the heat pump thereby lessening or eliminating the amount of coolant required to aircondition a conventional building structure.

Figure 6:
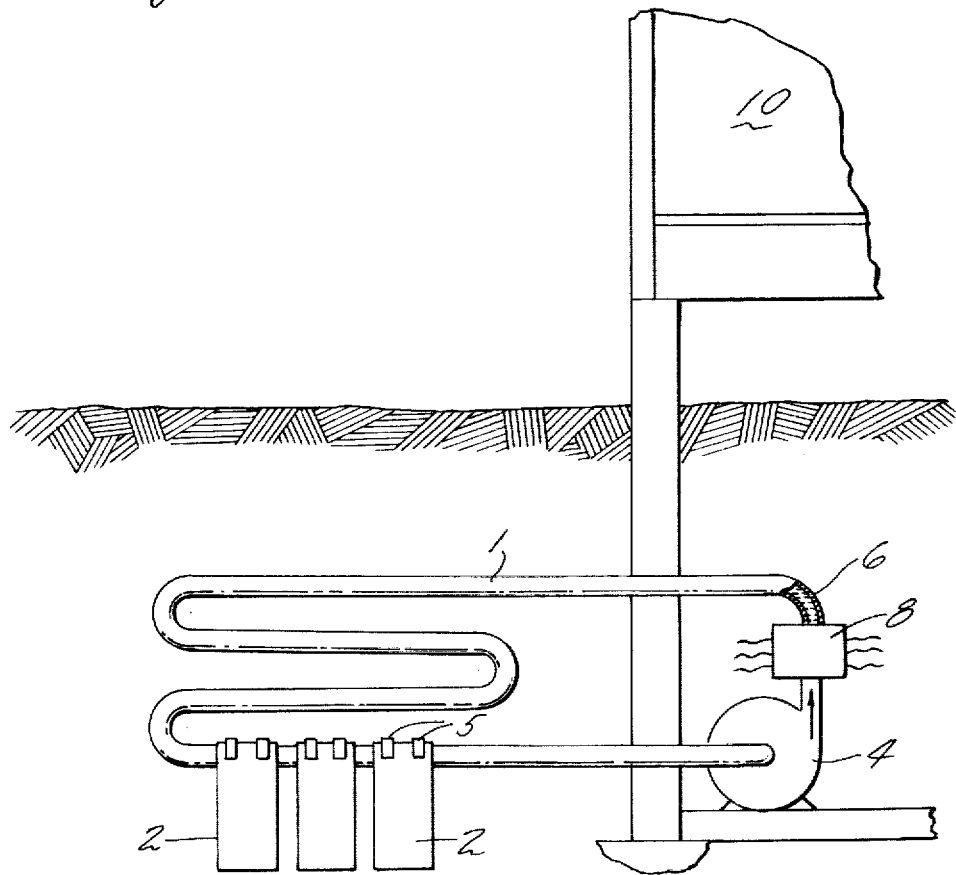
FIG. 6 demonstrates the heat pipe bag system in use with a residential or other building structure.

FIG. 6 demonstrates the heat pipe bag system in conjunction with a conventional building structure. Heat pipe bags 2 connected by clamps 5 to pipe 1 work on first heat transfer fluid 6 flowing through the pipe 1. The first heat transfer fluid passes through the heat pump-heat exchanger 8 to provide heating and cooling to building structure 9.

Typically, the heat pipe bags will be 2–10 feet wide and 2–12 feet long. The circulation pipes generally have inner diameters of 1–12 inches and thicknesses of one-eighth to one-half inch. The wick material will completely surround the heat transfer fluid pipe and extend preferably from the pipe to the end of the heat pipe bag. Such wicks are preferably one-half to one inch thick and 1–12 inches wide. The heat pipe bag will be basically the width of the wick conforming closely to it, note FIG. 2. The inclusion of spacers will naturally affect this width. Note FIGS. 4 and 5.

Also, the bags may be produced independent of the heat transfer fluid circulation pipes, adapted to be subsequently placed on said pipes. Note FIG. 7 comprising bag 2 and wicks 3. Such bags can be filled with heat transfer fluid and can be sealed to the pipe subsequently in production or at the installation site with adhesives, hot sealing or with either mechanical or molded clamps.

FIG. 8 demonstrates an embodiment of the present invention wherein the heat pipe bags are formed and sealed prior to being placed on the heat transfer fluid conduit. Heat pipe bag 2 containing wicks 3 and heat transfer fluid 4 is pre-sealed at 11 so as to form a closed system. The upper portion of the bag 12 is adapted to wrap around the heat transfer fluid conduit and can be secured to the conduit by clamps such as those described in FIG. 1, conventional adhesives or mechanical fastening means such as Velcro ® (American Velcro Inc.).

FIG. 9 demonstrates an embodiment of wicks in the heat pipe bags where wicks 3 extending radially outward from the heat transfer fluid conduit (not shown) are in fluid transfer contact with wick 13 which is at the end of the heat pipe bag and extends along the entire end portion of the bag. Such arrangement allows for heat transfer fluid distribution along the entire bag thus allowing for more efficient heat transfer, e.g. if the bag is tilted and fluid is accumulating preferentially on one side of the bag.

The heat pipe bag system may be installed by simply digging a very narrow trench, only a few inches wide, reflecting the width of the heat pipe bag which will result in relatively minimal cost and amount of earth disturbance and removal. The depth of the trench will be determined by the length of the bags and the circulation pipe would only have to be buried deep enough in the earth to avoid the frost line generally no more than 1 to 2 feet. The trench would subsequently be back filled with earth. Such an installation represents a significant improvement over installations necessary with conventional heat pipe systems.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A heat pipe bag for below-ground use the interior of which is adapted to be combined in heat transfer communication with the exterior of a first heat transfer fluid conduit and to contain in sealed fashion a second heat transfer fluid comprising a hollow, thin-walled bag having flexibility, puncture resistance, heat transfer fluid inertness, and prolonged below-ground exposure integrity, containing a wick material extending radially outward to the end of the bag from the intended location of the conduit along the anticipated path of principal heat transfer and including a plurality of spacers adjacent the wicks in the heat pipe bag.

2. The heat pipe bag of claim 1 wherein the second heat transfer fluid has a vapor pressure at or near atmospheric pressure between about 30° and 100° F.

3. The heat pipe bag of claim 1 wherein the second heat transfer fluid has a boiling point of 55° F. at atmospheric pressure.

4. The heat pipe bag of claim 1 wherein the heat pipe bag is plastic containing metal particles.

5. The heat pipe bag of claim 1 wherein the plastic is high density polyethylene.

6. The heat pipe bag of claim 1 wherein the heat pipe bag is rectangular in shape.

7. The heat pipe bag of claim 1 wherein the wick material is fiberglass.

8. A plurality of adjacent, connected heat pipe bags of claim 1 separated and sealed from each other by seam means.

9. The heat pipe bag of claim 1 wherein the heat pipe bag is plastic.

10. The heat pipe bag of claim 1 wherein the heat pipe bag is plastic containing metal flakes.

11. The heat pipe bag of claim 1 wherein the heat pipe bag is plastic reinforced with fiberglass.

12. The heat pipe bag of claim 1 wherein the heat pipe bag is plastic reinforced with metal foil.

13. A below-ground heat pipe system comprising a heat pipe bag, the interior of which is combined in heat transfer communication with the exterior of a first heat transfer fluid conduit, said bag containing in sealed fashion a second heat transfer fluid, said bag comprising a hollow, thin-walled bag having flexibility, puncture resistance, heat transfer fluid inertness and prolonged below-ground exposure integrity and containing a wick material in heat transfer communication with the exterior of the first heat transfer fluid conduit and extending radially outward to the end of the bag from the intended location of the conduit along the anticipated path of principal heat transfer and including a plurality of spacers adjacent the wicks in the bag.

14. The system of claim 13 wherein the second heat transfer fluid has a boiling point of about 55° F. at about one atmosphere of pressure.

15. The system of claim 13, wherein the conduit is aluminum.

16. The system of claim 15 wherein the plastic is high density polyethylene.

17. The system of claim 13 wherein the heat pipe bag is plastic containing metal particles.

18. The system of claim 17 wherein the plastic is high density polyethylene.

19. The system of claim 13 wherein the heat pipe bag is rectangular in shape.

20. The system of claim 13 wherein the wick is fiberglass.

21. The system of claim 13 wherein the second heat transfer fluid present in said bag has a vapor pressure at or near atmospheric at 30°–100° F.

22. The system of claim 13 wherein the conduit is copper.

23. The system of claim 13 wherein the conduit is plastic.

24. The system of claim 13 wherein the heat pipe bag is plastic.

25. The system of claim 13 wherein the heat pipe bag is plastic containing metal flakes.

26. The system of claim 13 wherein the heat pipe bag is plastic reinforced with fiberglass.

27. The system of claim 13 wherein the heat pipe bag is plastic reinforced with metal foil.

* * * * *